Sept. 8, 1959    J. B. BEAUGH ET AL    2,903,417
CONTROL OF CATALYTIC REFORMING
Filed Dec. 27, 1955    2 Sheets-Sheet 1

INVENTORS.
Benjamin W. Thomas,
BY John B. Beaugh,
James C. Schiller,
ATTORNEY.

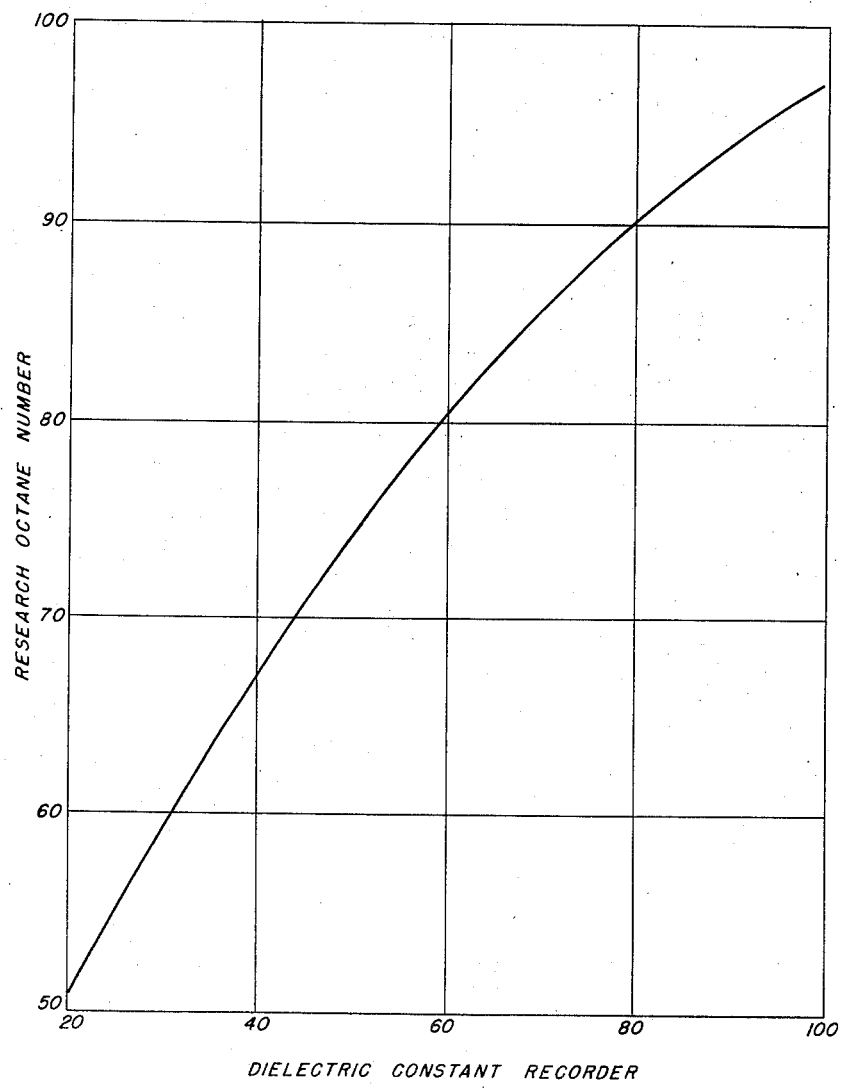

United States Patent Office 2,903,417
Patented Sept. 8, 1959

2,903,417
CONTROL OF CATALYTIC REFORMING

John B. Beaugh, James C. Schiller, and Benjamin W. Thomas, Baytown, Tex., assignors, by mesne assignments, to Esso Research and Engineering Company, Elizabeth, N.J., a corporation of Delaware Application December 27, 1955, Serial No. 555,379

10 Claims. (Cl. 208—136)

The present invention is directed to a method for controlling a catalytic conversion operation. More particularly, the invention is directed to catalytic reforming of hydrocarbons in which the operation is controlled. In its more specific aspects, the invention has to do with catalytic hydroforming of petroleum hydrocarbons.

The present invention may be briefly described as a method for controlling a catalytic conversion system in which paraffins and naphthenes are converted to aromatics to produce a hydrocarbon product of controlled octane number. In the present invention a feed hydrocarbon stream containing paraffins and naphthenes boiling in the range from about 100° to about 900° F. is charged to a catalytic conversion or reforming system and a product hydrocarbon stream is withdrawn from the system. At least a portion of one of the streams is flowed in the liquid phase at a substantially constant temperature through a capacitance cell of a dielectric constant meter as a result of which a signal is obtained from the cell which is a measure of the octane number of the selected stream. This signal is then employed to change or control a process variable in the catalytic conversion system.

The catalytic conversion operation may suitably be a hydroforming operation or a catalytic cracking operation or a dehydrogenation, aromatization or cyclization operation. Suitably the catalytic conversion may also be a cracking reaction such as one of the fluidized or fixed bed type.

The catalyst employed in the present invention where catalytic reforming or catalytic conversion is employed, may suitably be a catalyst comprising major portions of aluminum oxides and minor portions of oxides or sulfides of the metals of groups IV, V, VI and VIII of the Periodic Chart of the Atoms, 1947 edition, designed by Henry D. Hubbard, published by W. M. Welch Manufacturing Company, Chicago, Illinois. The oxides or sulfides of vanadium, molybdenum, chromium, tungsten and nickel are particularly effective. Various forms of aluminum oxide may be used, such as activated alumina, bauxite, alumina hydrates, alumina gel and peptized alumina gels. Catalysts comprising alumina, such as prepared from gamma alumina containing from about 1 to about 20% by weight of molybdenum oxide or chromium oxide, are very suitable for catalytic reforming in the present invention. Other suitable catalysts are the platinum-containing catalysts such as those containing from about 0.1 to 1.0 percent by weight of platinum deposited on a suitable carrier, such as catalytic grade alumina. When platinum catalysts are employed, it may be desirable to provide in contact with the catalyst a chloride to maintain the activity of the catalyst.

The present invention is suitably conducted in the presence of hydrogen which may be supplied as pure hydrogen or a gas containing hydrogen.

The term "catalytic reforming" wherever used in the specification and claims shall be understood to mean any process of subjecting hydrocarbon oils consisting essentially of hydrocarbons boiling in the gasoline range to heat treatment at a temperature in excess of 500° F. and in the presence of catalysts to produce a dehydrogenated or otherwise chemically reconstructed product, for example of anti-knock characteristics superior to those of the starting material, with or without an accompanying change in molecular weight. By the term "chemically reconstructed" is meant something more than the mere removal of impurities or ordinary finishing treatments. The term "catalytic reforming" shall be understood to include, but not by way of limitation, reactions such as dehydrogenation, aromatization or cyclization, desulfurization alkylation and isomerization, all or some of which may occur to a greater or lesser extent during the process.

The term "catalytic reforming in the presence of hydrogen," wherever used in the specification and claims, shall be understood to mean a process of catalytic reforming carried out in the presence of added or recirculated hydrogen or gases containing hydrogen under such conditions that there is either no overall net consumption of free hydrogen or there is an overall net production of free hydrogen.

Processes of catalytic reforming and catalytic reforming in the presence of hydrogen are endothermic and consequently heat must be supplied to the reaction zone to maintain the temperature required for the reaction. The catalysts ordinarily used in catalytic reforming and catalytic reforming in the presence of hydrogen gradually lose their activity in promoting the desired reactions because of the formation or deposition thereon during use of carbonaceous contaminants such as coke. These contaminants must be periodically removed in order to regenerate the activity of the catalysts. The length of time the catalyst can be used before it requires regeneration is much shorter in the case of catalytic reforming than in catalytic reforming in the presence of hydrogen and in fact this is one of the principal reasons for conducting the catalytic reforming treatment in the presence of hydrogen.

Hydroforming as used in the specification and claims is intended to cover catalytic reforming in the presence of hydrogen.

The dielectric constant meter employed in the practice of the present invention has been well described in the literature and further detailed description does not appear necessary. For example, in Analytical Chemistry, vol. 23, page 1750, December 1951, Thomas, Faegin and Wilson have described a dielectric constant meter for continuous determination of toluene which is readily adaptable to the practice of our invention. Similar apparatus will be found in the literature which is reviewed by Thomas et al. supra.

The apparatus employed in our operations includes a suitable recorder-controller of which many are available on the market. For example, the Brown Instrument Company recorder-controller may be employed or the so-called Foxboro dynalog recorder may be used, such as manufactured by the Foxboro Company, Foxboro, Massachusetts.

The present invention will be further illustrated by reference to the drawing in which:

Fig. 3 is a graph showing the relationship between research octane number and the reading of a dielectric constant recorder on a commercial hydroforming operation in which naphthas were charged to the recorder.

Figure 1:
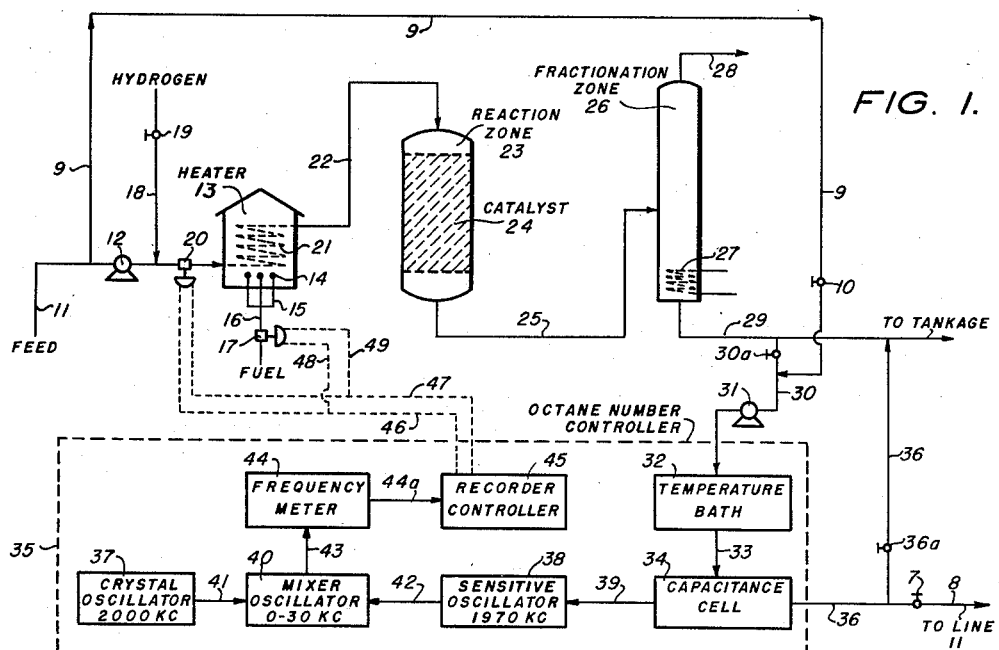
Fig. 1 is a flow diagram of a preferred mode for controlling a hydroforming operation.

Referring now to the drawing and first to Fig. 1, numeral 11 designates a feed line through which a feed hydrocarbon boiling in the range from about 100° to about 500° F. is fed into the system from a source, not shown. This feed hydrocarbon suitably is comprised of paraffins and naphthenes and may be either paraffins or naphthenes containing small amounts of virgin aromatics. The feed in line 11 is pumped by pump 12 into a heater or furnace 13 provided with burners 14, supplied with a fuel gas such as natural gas, through a manifold 15 from line 16 controlled by valve 17.

Hydrogen from a source not shown is introduced into line 11 by way of line 18 controlled by valve 19. Valve 20 in line 11 controls the rate of feed and hydrogen admitted to heater 13 for passage through heating coils 21. The heated feed mixture to which hydrogen has been added is discharged from coil 21 by way of line 22 into a reaction zone 23 provided with a bed of catalyst 24. Suitable conversion conditions are maintained in reaction zone 24 as a result of which the paraffins and naphthenes are converted substantially to aromatics and other fractions of higher octane number than the feed hydrocarbon. For example, as stated before, some isomerization, cracking and other reactions may take place. The product stream from reaction zone 23 issues therefrom by way of line 25 and is discharged by line 25 into fractionation zone 26. Fractionation zone 26 is suitably equipped with internal baffling equipment, such as bell cap trays and the like, for intimate contact between vapors and liquids and is provided with heating means, such as steam coil 27, for regulation of temperature and pressure. While fractionation zone 26 is illustrated as a single distillation tower, it suitably may comprise a plurality of distillation towers, each equipped with all auxiliary equipment necessary for such distillation towers, such as means for inducing reflux, condensing and cooling means and the like. Temperature and pressure conditions are adjusted to take off light fractions by way of line 28, such as $C_5$ and lighter hydrocarbons, while heavier fractions are withdrawn by way of line 29.

The heavier fractions withdrawn by line 29 which contain the desirable octane number components are then routed in large part thereby to tankage, not shown, but a portion of the stream is withdrawn from line 29 by line 30 containing pump 31 and is then introduced into a constant temperature bath 32 which is suitably held at a temperature of 120° F. The exact temperature of the bath 32 is not important so long as it is higher than the temperature of the stream in line 29 or atmospheric temperature. For the present invention, the temperature of the bath 32 may range from about 100° to about 130° F. Thereafter the oil stream flows from the constant temperature bath at a constant temperature by way of line 33 into capacitance cell 34 of a dielectric constant meter generally indicated by the numeral 35. The oil leaving the capacitance cell 34 then passes by line 36 back into line 29 for routing to tankage.

Alternatively, the feed stream may be routed by branch line 9 controlled by valve 10 to line 30 with valve 30a in line 30 closed. Under these circumstances valve 36a in line 36 would be closed and valve 7 in line 8 will conduct the sample from capacitance cell 34 back to line 11. Ordinarily, it is desirable to select a product stream as has been described.

The dielectric constant meter generally indicated by numeral 35 within the confines of the dotted lines is provided with a crystal oscillator 37 operating at about 2000 kc. which may be termed as a first oscillator. The output from the capacitance cell 34 passes through a sensitive oscillator 38 by way of conductor 39. The sensitive oscillator 38 operates at about 1970 kc. The outputs from oscillators 37 and 38 are fed into a mixer oscillator 40 by leads 41 and 42, respectively. The mixer oscillator 40 operates from 0 to 30 kc. and the output from the mixer oscillator 40, which represents the difference in frequency between the fixed oscillator 37 and the variable oscillator 38, is fed by conductor 43 into frequency meter 44 and thence by conductor 44a to recorder-controller 45 of the type mentioned. The capacitance cell 34 and the oscillators 37, 38 and 40 are suitably connected as indicated.

The recorder-controller 45 of the type mentioned may then be used to control a process variable in respect to the output signal from the frequency meter. By suitably connecting leads 46 and 47 to valve 20 which may suitably be an electrically operated valve, the amount of feed introduced into the heater 13 may be varied as desired. Pneumatic and hydraulically operated valves may also be used where the electric signal from controller 45 controls air or hydraulic fluid admitted to the valve. Alternatively, the fuel input to the heater 13 may also be varied, as desired, by connecting the leads 46 and 47 to branch leads 48 and 49, a suitable switching arrangement, not shown, being employed to switch the leads to valve 17. In this manner, it is possible to control either the feed rate or the temperature of the hydrocarbon being fed to the reaction zone 24.

In the preferred embodiment of Fig. 1, only a single reaction zone is shown, however, it is usual to employ a plurality of reaction zones, each containing catalyst of the type mentioned, and it is usual in hydroforming and similar operations to feed the hydrocarbon sequentially through the reaction zones although the feed may be charged to the reaction zones in parallel as may be desired.

The catalyst employed in reaction zone 24 is preferably a platinum catalyst on an alumina support.

The present invention is also applicable to fluidized operations, such as fluidized cracking or fluidized hydroforming.

Figure 2:
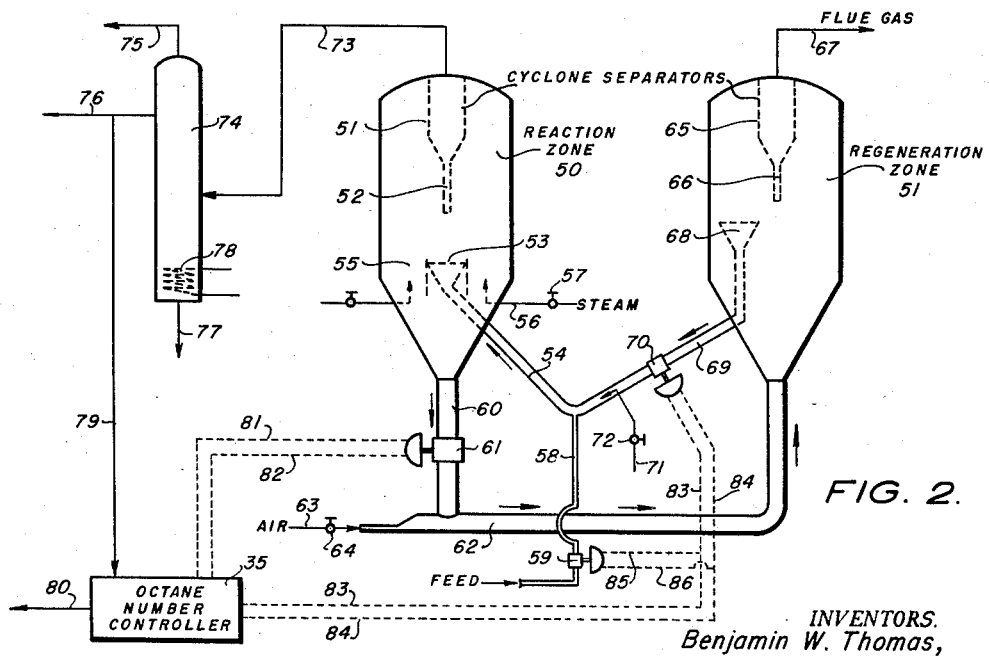
Fig. 2 is a flow diagram showing the adaptation of the present invention to control of a fluidized solids conversion reaction.

Referring to Fig. 2, the application of the present invention to fluidized cracking will now be described. In Fig. 2 a fluidized cracking operation provided with a reaction zone 50 and a regeneration zone 51 is described for purposes of illustration. Reaction zone 50 is of the so-called down-flow type and has a cyclone separator 51 which may be a plurality of cyclone separators provided with dip legs 52, a suitable inlet grid plate 53 serves for introduction of catalyst in the feed by way of line 54. Hydrocarbons and carbonaceous matter are stripped from the catalyst in reaction zone 50 in an annular stripping zone 55 by means of steam or other stripping gas introduced thereto by line 56 controlled by valve 57. Feed hydrocarbon is introduced into line 54 by way of line 58 connected thereto controlled by valve 59.

Spent catalyst from reaction zone 50 discharges therefrom by way of line 60 controlled by valve 61 into line 62 which introduces the spent catalyst into regeneration zone 51. Air for transporting the spent catalyst and for causing the combustion operation is introduced into line 62 by way of line 63 controlled by valve 64. In regeneration zone 51 a combustion operation takes place which serves to remove the burnable deposits from the catalyst. The combustion or flue gas is discharged from zone 51 through cyclones 65 which are provided with dip leg 66, which serves to remove a substantial part of the catalyst from the flue gas and the flue gas is then routed by line 67 to separators, such as Cottrell separators, not shown.

The catalyst in regeneration zone 51 is regenerated by virtue of the combustion operation and falls into the hopper or funnel 68 and is then transported by line 69, controlled by valve 70 into line 54 for admixture with the feed oil introduced by line 58. A fluidizing gas or vapor, such as steam, is suitably introduced into line 69 by line 71 controlled by valve 72. The products from the reaction zone 50, after separation of substantially all of the catalyst therefrom, discharge by line 73 into a fractionation zone 74 which is similar to fractionation zone 26 of Fig. 1.

In fractionation zone 74 light gaseous fractions are removed by line 75 and gasoline hydrocarbons are discharged by line 76 while heavier fractions are withdrawn by line 77. Temperatures and pressures in zone 74 are adjusted by heating means 78. A portion of the gasoline hydrocarbons in line 76 is circulated by way of line 79 into a temperature bath 32 of a capacitance cell 34 such as shown in the dotted lines of the dielectric constant meter 35 shown more clearly in Fig. 1, the gasoline stream introduced by line 79 being discharged from the octane number controller or dielectric constant meter 35 by way of line 80. The dielectric constant meter or octane number controller 35 is connected by leads 81 and 82 to valve 61 whereby the amount of catalyst withdrawn from reaction zone 50 may be controlled with respect to the octane number of the product. Likewise, valve 59 is connected to the dielectric constant meter by way of leads 83 and 84 and branch leads 85 and 86 which will serve to control the feed rate in respect to the signal from the dielectric constant meter. The leads 83 and 84 are also connected to valve 70 such that the catalyst introduced into the reaction zone 50 may also be controlled in respect to octane number.

In operation, in the preferred embodiment of Fig. 1, feed hydrocarbons suitably boiling from about 100° to about 500° F. are suitably employed. These fractions may be fractions resulting from thermal or catalytic conversion reactions or may be fractions obtained from crude petroleum or mixtures thereof.

In the embodiment of Fig. 2, the feed hydrocarbon introduced by line 58 may suitably boil in the range from about 100° to about 900° F. and may include gas oils and heavier fractions boiling in this range. These fractions may be obtained from distillation of crude petroleum, deasphalting operations, thermal and catalytic cracking operations, and the like.

In the preferred embodiment of Fig. 1, temperatures in reaction zone 23 may range from about 800° to about 1000° F. with a preferred inlet temperature employing a platinum catalyst in the range from about 900° to 1000° F.

Space velocities may range from about 0.5 to about 6 volumes of feed per volume of catalyst per hour.

In the embodiment of Fig. 2, wherein a catalytic cracking operation is employed, the temperatures in reaction zone 50 may range from about 800° to about 1150° F., whereas the temperatures in regeneration zone 51 may range from about 900° to about 1200° F.

The present invention is suitably applicable to either fixed bed or fluidized hydroforming operations. In the fixed bed operations, platinum catalyst and molybdenum oxide-containing catalysts may suitably be employed. In fluidized hydroforming operations, a fluidized molybdenum-containing catalyst may be used. In catalytic cracking operations the catalyst is suitably a silica-alumina cracking catalyst of a well-known type although other cracking catalysts such as silica-zirconia, silica-magnesia, and the like may be used.

In order to illustrate the invention further, a Foxboro capacitance dynalog was operated on feed and product streams of commercial hydroformers. As a result of flowing the feed and product streams separately through the Foxboro capacitance dynalog sample cell signals were obtained which are suitable for controlling process variables in the hydroformer.

A plot of research octane number data vs. dielectric constant recorder readings for 300° F. end point naphtha was constructed by obtaining readings obtained by passing naphtha, such as produced in hydroforming operations, through the dielectric constant meter. Research octane numbers on these naphthas were also obtained. These data are presented in Fig. 3. It will be seen from these data that there is a correlation between research octane number of these naphthas with the dielectric constant recorder readings. Thus, a signal is obtained which is suitably used to position a valve for octane number control.

Additional data were obtained on 260, 300 and 350 degrees F. end point naphthas such as obtained from hydroforming operations. A correlation between the octane number and the dielectric constant meter output was noted which allows the signal from the dielectric constant meter to be employed to control a process variable.

The present invention is of considerable utility and advantage in that a naphtha of controlled octane number may be produced and smoother operation may be achieved than obtainable heretofore. Furthermore, the present invention allows desired operating conditions to be obtained easily after switching feed stocks or replacing feed reactants where fixed bed hydroforming operations are employed. In short, the present invention is quite advantageous economically and from a process operating standpoint since smoother operations producing products of controlled octane number are obtainable by practicing the present invention than was obtainable heretofore. In short, the octane number of a hydroformer product may be controlled more closely to a controlled point, than was possible heretofore, by practicing the present invention.

The nature and objects of the present invention having been completely described and illustrated, what we wish to claim as new and useful and to secure by Letters Patent is:

1. A method for controlling a catalytic conversion system in which paraffins and naphthenes are converted to aromatics to produce a hydrocarbon product of controlled octane number in which a feed hydrocarbon stream containing a mixture of paraffins and naphthenes boiling in the range from about 100° to about 900° F. is charged to said system and a product hydrocarbon stream is withdrawn from said system which comprises flowing at least a portion of one of said streams in the liquid phase at a substantially constant temperature through a capacitance cell of a dielectric constant meter, the stream flowed through said cell containing other hydrocarbons of desirable Research octane number and aromatics, obtaining from said cell a signal which increases with increasing Research octane number and which is a measure of the Research octane number of said selected stream, and employing said signal to change a process variable in said catalytic conversion system.

2. A method in accordance with claim 1 in which the catalytic conversion is hydroforming.

3. A method in accordance with claim 1 in which the catalytic conversion is cracking.

4. A method for controlling a catalytic hydroforming system in which paraffins and naphthenes are converted to aromatics to produce a hydrocarbon product of controlled octane number in which a feed hydrocarbon stream containing a mixture of paraffins and naphthenes boiling in the range from about 100° to about 500° F. is charged to said system and a product hydrocarbon stream is withdrawn from said system which comprises flowing at least a portion of one of said streams in the liquid phase at a substantially constant temperature through a capacitance cell of a dielectric constant meter, the stream flowed through said cell containing other hydrocarbons of desirable Research octane number and aromatics, obtaining from said cell a signal which increases with increasing Research octane number and which is a measure of the Research octane number of said selected stream, and employing said signal to change a process variable in said catalytic hydroforming system.

5. A method in accordance with claim 4 in which a molybdenum-containing catalyst is employed in the catalytic hydroforming system.

6. A method in accordance with claim 4 in which a platinum-containing catalyst is employed in the catalytic hydroforming system.

7. A method for controlling a catalytic hydroforming system in which paraffins and naphthenes are converted to aromatics to produce a hydrocarbon product of controlled octane number in which a feed hydrocarbon stream containing a mixture of paraffins and naphthenes boiling in the range from about 100° to about 500° F. is charged to said system at a temperature in the range from about 800° to about 1000° F. and a product hydrocarbon stream is withdrawn from said system which comprises flowing at least a portion of the product stream in the liquid phase at a substantially constant temperature through a capacitance cell of a dielectric constant meter, the portion of said product stream flowed through said cell containing other hydrocarbons of desirable Research octane number and aromatics, obtaining from said cell a signal which increases with increasing Research octane number and which is a measure of the Research octane number of the product stream, and employing said signal to vary the temperature in said range in response to the Research octane number of the product.

8. A method for controlling a catalytic hydroforming system in which paraffins and naphthenes are converted to aromatics to produce a hydrocarbon product of controlled octane number in which a feed hydrocarbon stream containing a mixture of paraffins and naphthenes boiling in the range from about 100° to about 500° F. is charged to said system at a space velocity in the range from about 0.5 to about 6 v./v./hour at a temperature in the range from about 800° to about 1000° F. and a product hydrocarbon stream is withdrawn from said system which comprises flowing at least a portion of the product stream in the liquid phase at a substantially constant temperature through a capacitance cell of a dielectric constant meter, the portion of said product stream flowed through said cell containing other hydrocarbons of desirable Research octane number and aromatics, obtaining from said cell a signal which increases with increasing Research octane number and which is a measure of the Research octane number of the product stream, and employing said signal to vary the space velocity in said range in response to the Research octane number of the product.

9. A method for controlling a catalytic hydroforming system in which paraffins and naphthenes are converted to aromatics to produce a hydrocarbon product of controlled octane number in which a feed hydrocarbon stream containing a mixture of paraffins and naphthenes boiling in the range from about 100° to about 500° F. is charged to said system at a temperature in the range from about 800° to about 1000° F. and a product hydrocarbon stream is withdrawn from said system which comprises flowing at least a portion of the feed stream in the liquid phase at a substantially constant temperature through a capacitance cell of a dielectric constant meter, the portion of said feed stream flowed through said cell containing paraffins and naphthenes of desirable Research octane number and aromatics, obtaining from said cell a signal which increases with increasing Research octane number and which is a measure of the Research octane number of the feed stream, and employing said signal to vary the temperature in said range in response to the Research octane number of the feed stream.

10. A method for controlling a catalytic hydroforming system in which paraffins and naphthenes are converted to aromatics to produce a hydrocarbon product of controlled octane number in which a feed stream containing a mixture of paraffins and naphthenes boiling in the range from about 100° to about 500° F. is charged to said system at a space velocity in the range from about 0.5 to about 6 v./v./hr. at a temperature in the range from about 800° to about 1000° F. and a product hydrocarbon stream is withdrawn from said system which comprises flowing at least a portion of the feed stream in the liquid phase at a substantially constant temperature through a capacitance cell of a dielectric constant meter, the portion of said feed stream flowed through said cell containing paraffins and naphthenes of desirable Research octane number and aromatics, obtaining from said cell a signal which increases with increasing Research octane number and which is a measure of the Research octane number of the feed stream, and employing said signal to vary the space velocity in said range in response to the Research octane number of the feed stream.

References Cited in the file of this patent
UNITED STATES PATENTS

| | | |
|---|---|---|
| 2,306,606 | Hirsch | Dec. 29, 1942 |
| 2,335,717 | Welty et al. | Nov. 30, 1943 |
| 2,499,626 | Bowman | Mar. 7, 1950 |
| 2,642,381 | Dickinson | June 16, 1953 |
| 2,737,469 | Anderson et al. | Mar. 6, 1956 |